United States Patent
Kamiya et al.

(10) Patent No.: US 8,055,429 B2
(45) Date of Patent: Nov. 8, 2011

(54) PARKING SUPPORT CONTROL APPARATUS AND PARKING SUPPORT CONTROL SYSTEM

(75) Inventors: Kazuhiro Kamiya, Anjo (JP); Yukio Mori, Kariya (JP); Kazuya Watanabe, Anjo (JP)

(73) Assignees: Advics Co., Ltd., Aichi-pref (JP); Aisin Seiki Kabushiki Kaisha, Aichi-pref (JP)

( * ) Notice: Subject to any disclaimer, the term of this patent is extended or adjusted under 35 U.S.C. 154(b) by 946 days.

(21) Appl. No.: 11/989,545

(22) PCT Filed: Jun. 23, 2006

(86) PCT No.: PCT/JP2006/312586
§ 371 (c)(1),
(2), (4) Date: Jan. 28, 2008

(87) PCT Pub. No.: WO2007/013246
PCT Pub. Date: Feb. 1, 2007

(65) Prior Publication Data
US 2009/0132143 A1    May 21, 2009

(30) Foreign Application Priority Data
Jul. 28, 2005    (JP) .................. 2005-218767

(51) Int. Cl.
*B60T 7/12* (2006.01)
(52) U.S. Cl. .......................................... 701/96
(58) Field of Classification Search .......... 701/96; 180/199, 170; 340/932.2, 933, 435–438; 705/13
See application file for complete search history.

(56) References Cited

U.S. PATENT DOCUMENTS

| | | | |
|---|---|---|---|
| 7,053,795 B2 * | 5/2006 | Maemura et al. | 340/932.2 |
| 7,660,659 B2 * | 2/2010 | Watanabe et al. | 701/96 |
| 2007/0279493 A1 * | 12/2007 | Edanami | 348/148 |
| 2010/0228426 A1 * | 9/2010 | Suzuki et al. | 701/29 |

FOREIGN PATENT DOCUMENTS

| | | |
|---|---|---|
| GB | 2284028 | 5/1995 |
| JP | A-07-165037 | 6/1995 |
| JP | A-11-105686 | 4/1999 |
| JP | A-2003-11760 | 1/2003 |
| JP | A-2004-338636 | 12/2004 |

OTHER PUBLICATIONS

International Search Report of the International Searching Authority mailed on Sep. 19, 2006 for the corresponding International patent application No. PCT/JP2006/312586.
Office Action mailed on May 17, 2011 issued in the corresponding Japanese Patent Application No. 2005-218767 (English translation enclosed).

* cited by examiner

*Primary Examiner* — Yonel Beaulieu
(74) *Attorney, Agent, or Firm* — Posz Law Group, PLC

(57) ABSTRACT

An initial value θ0 of a vehicle deflection angle θ and an initial value L0 of a distance L are set, a normalized coefficient R is determined from the ratio of the vehicle deflection angle θ or the distance L to the initial value θ0 or the initial value L0 when vehicle stop control is started, and the target speed VREF of a body speed VL is determined by that coefficient R. Since the body speed V of the vehicle VL is very low when the vehicle VL arrives at a target parking position, the vehicle VL can be stopped precisely at the target parking position.

19 Claims, 6 Drawing Sheets

PARKING SUPPORT CONTROL APPARATUS AND PARKING SUPPORT CONTROL SYSTEM

TECHNICAL FIELD

The present invention relates to parking support control apparatuses and parking support control systems capable of stopping a vehicle at a desired position with high accuracy by a vehicle stop control operation during a parking support control operation.

BACKGROUND ART

Parking support control apparatuses, such as the one disclosed in Japanese Unexamined Patent Application Publication No. 2003-11760, capable of controlling a parking support control operation so that a driver can efficiently stop a vehicle at a desired position when parking the vehicle have already been proposed. Such parking support control apparatuses are configured to generate a braking force by means of an automatic brake when stopping a vehicle.

However, Patent Document mentioned above, for example, merely describes that a vehicle stop operation initiated by the parking support control apparatus is achieved by means of an automatic brake, without any description of a specific method for stopping the vehicle at a desired position with high accuracy.

DISCLOSURE OF INVENTION

In view of such a problem, the present invention aims at providing a parking support control apparatus and a parking support control system enabling a driver to efficiently stop a vehicle at a target parking position by means of a parking support control operation.

A first feature of the present invention is that a parking support control apparatus includes current position detecting means (110) for obtaining a current position of the vehicle (VL) traveling along the trajectory; displacement magnitude calculating means (115, 120) for calculating a displacement magnitude (θ, L) of the vehicle (VL) to be moved from the current position to the target parking position; target speed determining means (150, 175) for determining a target speed (VREF), on the basis of a reference displacement magnitude that is set as the displacement magnitude of the vehicle (VL) that is considered to bring the vehicle (VL) to the target parking position, such that a speed of the vehicle (VL) becomes lower as the displacement magnitude of the vehicle (VL) at the current position becomes closer to the reference displacement magnitude; and brake request means (155, 160, 180) for outputting a brake request so that the vehicle (VL) travels at the target speed and for stopping the vehicle (VL) when the displacement magnitude becomes equal to the reference displacement magnitude.

As described above, the target speed (VREF) of the vehicle (VL) becomes lower as the displacement magnitude of the vehicle (VL) becomes closer to the reference displacement magnitude. Thus, when the vehicle (VL) arrives at the target parking position, the vehicle speed (V) of the vehicle (VL) is very low. Therefore, the vehicle (VL) can be stopped at the target parking position with high accuracy.

Examples of the displacement magnitude (θ, L) of the vehicle (VL) in this case includes the distance (L) from the current position to the target parking position, or the vehicle deviation angle (θ) defined as an angle between an orientation of the vehicle (VL) at the current position and an orientation of the vehicle (VL) at the target parking position.

In the first feature of the present invention, control start status determining means (125) determines an initial displacement magnitude (θ0, L0) equivalent to an initial value of the displacement magnitude, and determines a vehicle-stop-control start position at which the vehicle stop control operation is to be started upon the arrival thereto of the vehicle (VL) traveling along the calculated trajectory in accordance with the initial displacement magnitude (θ0, L0). Further, the initial vehicle speed setting means (135) sets, as an initial vehicle speed (V0), the vehicle speed (V) obtained by the vehicle speed detecting means (100) when the displacement magnitude becomes equal to the initial displacement magnitude (θ0, L0) Furthermore, when the current position matches the vehicle-stop-control start position, the target speed determining means (150, 175) sets the target speed (VREF) as a value obtained by multiplying a ratio of the displacement magnitude (θ, L) to the initial displacement magnitude (θ0, L0) by the initial vehicle speed (V0).

As described above, the initial displacement magnitude (θ0, L0) and the initial vehicle speed (V0) are determined first, and then a ratio of the displacement magnitude (θ, L) to the initial displacement magnitude (θ0, L0) is multiplied by the initial vehicle speed (V0). The value obtained in this manner can be set as the target speed (VREF). Accordingly, as the displacement magnitude of the vehicle (VL) becomes closer to the reference displacement magnitude, the target speed (VREF) of the vehicle (VL) can be made lower.

The vehicle-stop-control start position is preferably determined as, for example, a position where the displacement magnitude (θ, L) on the travel path becomes equal to the initial displacement magnitude (θ0, L0) or a position immediately therebefore.

The current position can be determined, for example, from a traveling distance of the vehicle (VL) traveling along the trajectory, the traveling distance being calculated on the basis of traveling distances of at least two rear wheels (4RL, 4RR) determined from detection signals of wheel speed sensors (5FL, 5FR, 5RL, 5RR) provided in correspondence with wheels (4FL, 4FR, 4RL, 4RR) included in the vehicle (VL) and a steering angle determined from a detection signal of a steering angle sensor (51) included in the vehicle (VL).

The above descriptions concern the case where the present invention provides a parking support control apparatus, i.e., an apparatus that executes a control operation for actuating various devices included in a vehicle (VL). However, the present invention is not limited thereto. For example, a parking support apparatus including the above-described features of the present invention can also be considered as a parking support control system including braking force applying means (2, 3) for applying a braking force to wheels (4FL, 4FR, 4RL, 4RR) included in the vehicle (VL).

Reference numerals in brackets provided to the means described above indicate the correspondence with means specified in embodiments to be described below.

BEST MODE FOR CARRYING OUT THE INVENTION

Embodiments of the present invention will now be described with reference to the drawings.

First Embodiment

A parking support control system to be installed in a vehicle to which a first embodiment of the invention is applied will be described with reference to the drawings.

Figure 1:
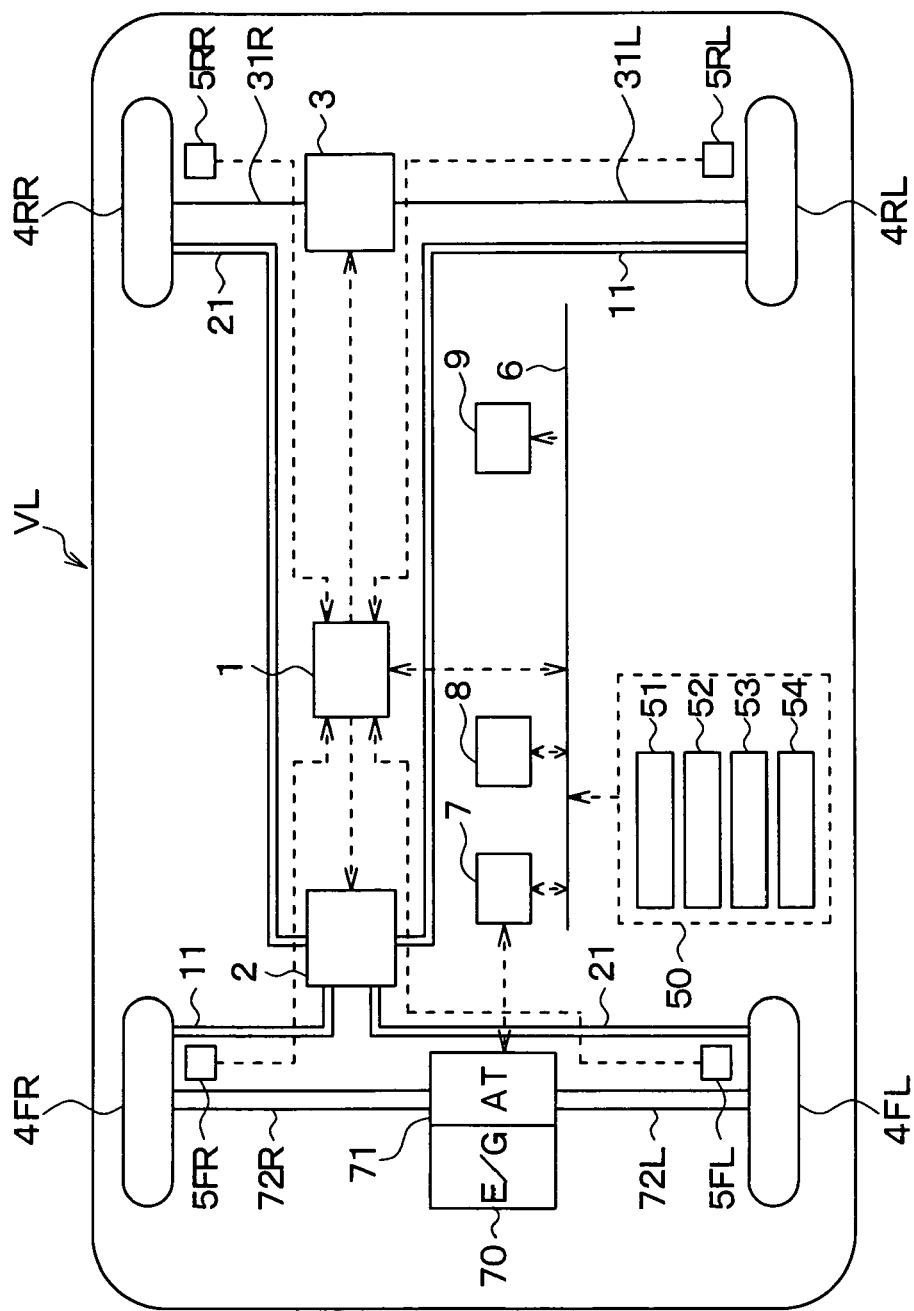
FIG. 1 is a diagram showing the entire configuration of a parking support control system according to a first embodiment of the invention.

FIG. 1 is a diagram showing the entire configuration of the parking support control system according to the first embodiment of the present invention. In FIG. 1, components corresponding to a left front wheel, a right front wheel, a left rear wheel, and a right rear wheel of a vehicle VL are denoted by FL, FR, RL, and RR, respectively.

The parking support control system in the first embodiment includes a brake control ECU 1; a hydraulic braking device 2; an electric parking brake (hereinafter abbreviated as PKB) 3; wheel cylinders (hereinafter referred to as W/Cs) 41FL, 41FR, 41RL, and 41RR (see FIG. 2) provided for wheels 4FL, 4FR, 4RL, and 4RR, respectively; wheel speed sensors 5FL, 5FR, 5RL, and 5RR; an in-vehicle LAN bus 6; an engine control ECU 7; a parking support control ECU 8; a warning indication and alarm generation device 9; and a sensor unit 50 including various sensors.

Among these components, the brake control ECU 1, the engine control ECU 7, the parking support control ECU 8, the warning indication and alarm generation device 9, and the sensor unit 50 are individually connected to the in-vehicle LAN bus 6 and are capable of sending or receiving signals thereamong via the in-vehicle LAN bus 6.

The brake control ECU 1, which includes a computer, inputs via the in-vehicle LAN bus 6 a brake request from the parking support control ECU 8 and sensor signals from the wheel speed sensors 5FL to 5RR and the sensor unit 50, and outputs actuating signals for controlling the hydraulic braking device 2 and the PKB 3, to be described below, and a control signal for the engine control ECU 7.

Figure 2:
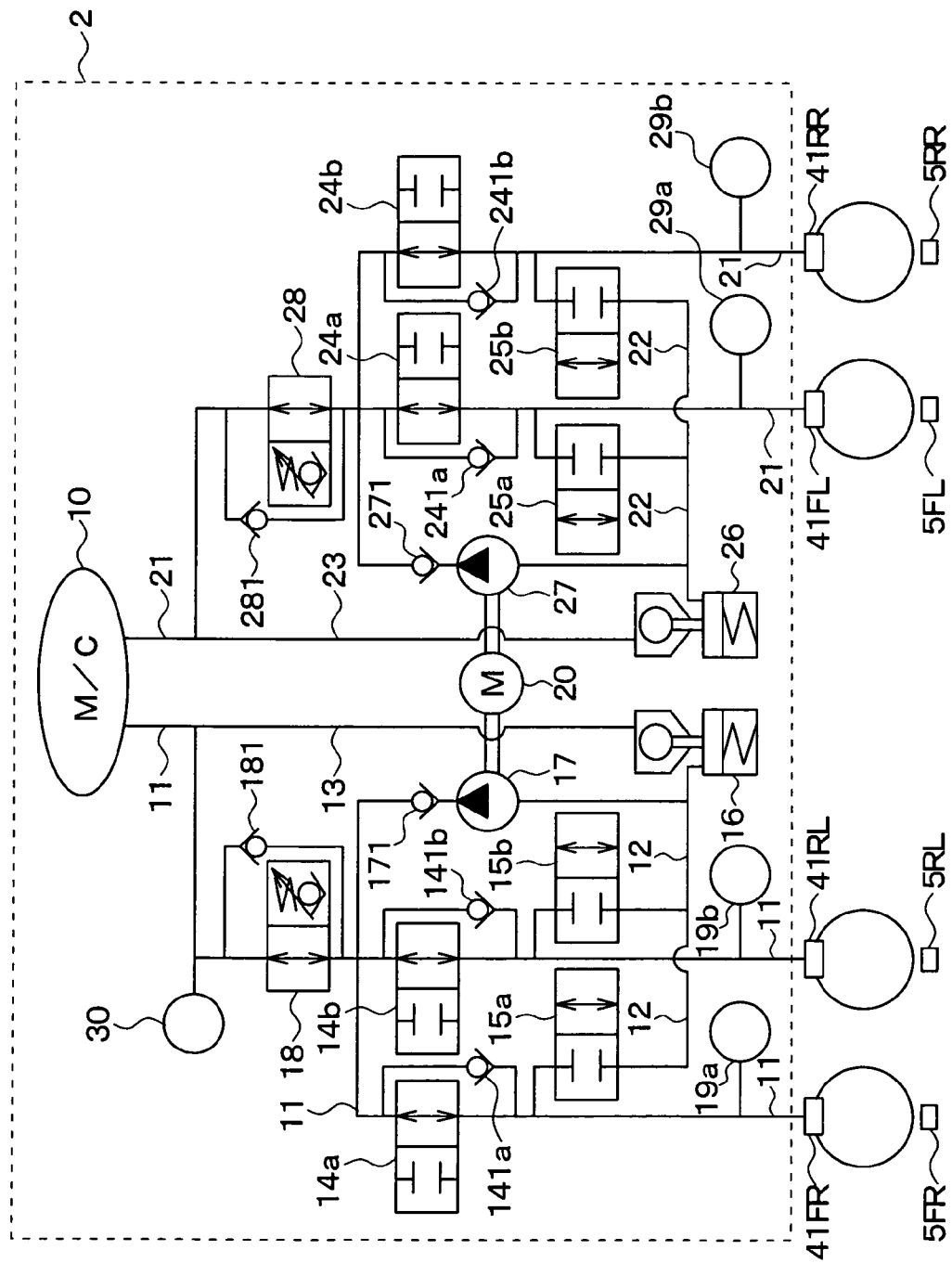
FIG. 2 is a diagram showing a specific piping configuration of a hydraulic braking device 2 included in the parking support control system shown in FIG. 1.

The hydraulic braking device 2 is equivalent to braking force applying means for providing a braking force to the wheels 4FL to 4RR. FIG. 2 is a diagram showing a specific piping configuration of the hydraulic braking device 2. Referring to FIG. 2, the hydraulic braking device 2 will be described.

When a brake pedal, not illustrated, is depressed by a driver, a master cylinder (hereinafter referred to as M/C) 10 generates an M/C pressure in accordance with the force applied to the brake pedal detected by a braking operation amount sensor 53, to be described below, included in the sensor unit 50. The M/C 10 is connected with a first piping system 11 and a second piping system 21, to which the W/Cs 41FL to 41RR are diagonally connected.

The brake fluid pressure generated by the M/C 10 is transmitted through the first and second piping systems 11 and 21 to the W/Cs 41FL to 41RR provided for the wheels, and generates a first braking force.

The following description focuses on the first piping system 11, particularly the piping system for the right front wheel 4FR. The description also applies to the other wheels and the second piping system.

The first piping system 11 includes pressure increase control valves 14a and 14b for the right front wheel 4FR and the left rear wheel 4RL, respectively. The pressure increase control valves 14a and 14b control increase or retention of the pressure applied to the W/Cs 41FR and 41RL during ABS control. The pressure increase control valves 14a and 14b are provided with check valves 141a and 141b, respectively, parallel therewith so that, if the W/C pressure becomes excessive while the pressure increase control valves 14a and 14b are closed, the flow of the fluid is returned toward the M/C 10.

Drain pipes 12 extending from respective sections between the pressure increase control valves 14a and 14b and the W/Cs 41FR and 41RL have pressure decrease control valves 15a and 15B that control decrease or retention of the pressure applied to the W/C 41FR and 41RL during ABS control. The drain pipes 12 are connected to a reservoir 16.

The brake fluid reserved in the reservoir 16 is drawn by a pump 17 actuated by a motor 20, and then discharged to a section between a master cut valve (hereinafter referred to as SM valve) 18, to be described below, and the pressure increase control valves 14a and 14b. The pump 17 is provided at its discharge port with a check valve 171 so that the discharge port of the pump 17 is not subjected to a high brake-fluid pressure.

Between the M/C 10 and the pressure increase control valves 14a and 14b is disposed the SM valve 18, which is a two-position valve that is open when it is not supplied with electricity and is closed by a check valve oriented in a direction shown in FIG. 2 when it is supplied with electricity. The SM valve 18 is configured to become open from the closed position to release the pressure when the pressure applied to the W/C 41FR and 41RL becomes larger than that applied by the M/C 10 due to the cracking pressure generated by a spring of the check valve. The SM valve 18 is provided with a check valve 181 parallel therewith so as to only permit the flow of the fluid from the M/C 10 toward the W/C 41FR and 41RL.

The section between the M/C 10 and the SM valve 18 is connected to the reservoir 16 with a suction pipe 13 provided therebetween.

In a section of the first piping system 11 between the M/C 10 and the SM valve 18 is provided a hydraulic sensor 30 for detecting the brake fluid pressure generated by the M/C 10. The brake fluid pressure detected by the hydraulic sensor 30 is a pressure produced in a secondary chamber (not illustrated) of the M/C 10. However, since the same pressure is generated in a primary chamber connected with the second piping system, the hydraulic sensor 30 can practically detect the M/C pressure.

Also, hydraulic sensors 19a and 19b are provided in sections between the pressure increase control valves 14a and 14b and the W/C 41FR and 41RL, respectively, thereby enabling the detection of the individual W/C pressures.

Output signals of the hydraulic sensor 30 and the hydraulic sensors 19a and 19b are input to the brake control ECU 1.

The pressure increase control valves 14a and 14b and the pressure decrease control valves 15a and 15b are two-position valves. When these valves are not supplied with electricity (the OFF state) in such a case where the brake pedal is not operated or where a normal brake operation is performed, the valves are in the positions shown in FIG. 2, that is, the pressure increase control valves 14a and 14b are open but the pressure decrease control valves 15a and 15b are closed (cut). Additionally, the SM valve 18 is also in a position shown in FIG. 2, i.e., open, when it is not supplied with electricity, i.e., in the normal state.

These control valves are actuated in accordance with operation signals supplied from the brake control ECU 1. The motor 20 that actuates the pumps 17 and 27 is also actuated in accordance with operation signals supplied from the brake control ECU 1.

The second piping system has the same configuration as that of the first piping system, as described above. That is, the pressure increase control valves 14a and 14b and the check valves 141a and 141b correspond to pressure increase control valves 24a and 24b and check valves 241a and 241b, respectively. Further, the pressure decrease control valves 15a and 15b correspond to pressure decrease control valves 25a and 25b, respectively. The reservoir 16 corresponds to a reservoir 26. The pump 17 and the check valve 171 correspond to a pump 27 and a check valve 271, respectively. The SM valve 18 and the check valve 181 correspond to an SM valve 28 and a check valve 281, respectively. The hydraulic sensors 19a and 19b correspond to hydraulic sensors 29a and 29b, respectively. The pipes 11, 12, and 13 correspond to pipes 21, 22, and 23, respectively.

Next, a basic method for controlling the hydraulic braking device 2 will be described.

In a normal brake operation where the brake pedal is depressed by the driver, all the control valves (SM valve 18, pressure increase control valve 14a, and pressure decrease control valve 15a) are not supplied with electricity (the OFF state). Therefore, the M/C pressure directly acts on the W/C 41FR and 41RL, whereby the W/C pressure becomes equal to the M/C pressure.

Operations to be performed during ABS control are different between the case where the W/C pressure is reduced to avoid locking of tires and the case where the W/C pressure is increased to get back the braking force. During ABS control, the SM valve 18 is normally in the OFF (open) state while the pump 17 is actuated to draw the brake fluid from the reservoir 16.

First, in the case of reducing the pressure during ABS control, the pressure increase control valve 14a is supplied with electricity (the ON state), i.e., the closed (cut) state, while the state of the pressure decrease control valve 15a is controlled on the basis of an ON-to-OFF duty ratio. Thus, the switching between the open and cut states is repeated. This causes the brake fluid to flow from the W/C 41FR to the reservoir 16, thereby reducing the W/C pressure at a predetermined gradient.

In the case of increasing the pressure during ABS control, the pressure decrease control valve 15a is not supplied with electricity (the OFF state), i.e., the cut state, while the state of the pressure increase control valve 14a is controlled on the basis of an OFF-to-ON duty ratio. Thus, the switching between the open and cut states is repeated. This causes the brake fluid to be supplied from the M/C 10 to the W/C 41FR, thereby increasing the W/C pressure.

Next, during the parking support control operation, the brake control ECU 1 outputs a control signal to the hydraulic braking device 2 in accordance with a brake request signal supplied from the parking support control ECU 8, whereby desired W/C pressures are generated for the individual wheels 4FL to 4RR.

Specifically, in order to increase the W/C pressure during the parking support control operation, the SM valve 18 is set to the ON (cut) state and the pressure decrease control valve 15a is set to the OFF (cut) state. Further, while a discharge pressure is generated by actuating the pump 17 to draw the brake fluid from the reservoir 16, the W/C pressure is increased, in comparison with a value detected by the hydraulic sensor 19a, by controlling the pressure increase control valve 14a on the basis of an OFF-to-ON duty ratio at a predetermined gradient or until a preset target pressure is obtained. In this case, the brake fluid may be additionally supplied, as occasion demands, from the M/C 10 through the suction pipe 13 and the reservoir 16 to the suction port of the pump 17.

On the other hand, in order to reduce the W/C pressure during the parking support control operation, the SM valve 18 is set to the ON (cut) state and the pressure increase control valve 14a is set to the ON (cut) state. Further, while a discharge pressure is generated by actuating the pump 17 to draw the brake fluid from the reservoir 16, the W/C pressure is reduced, in comparison with a value detected by the hydraulic sensor 19a, by controlling the pressure decrease control valve 15a on the basis of an ON-to-OFF duty ratio at a predetermined gradient or by drawing the brake fluid from the W/C 41FR until a preset target pressure is obtained. In this case, since the pressure increase control valve 14a and the SM valve 18 are both in the cut state, the discharge pressure of the pump 17 increases. However, if the increased discharge pressure becomes larger than the cracking pressure generated by the spring of the check valve for the SM valve 18, the valves are released thereby reducing the pressure.

Next, the PKB 3 will be described. The PKB 3 is basically actuated by the operation of a parking brake switch (not illustrated) initiated by the driver, but is also used for the braking operation in the parking support control operation, as occasion demands. Therefore, the PKB 3 is also equivalent to braking force applying means, the same as the hydraulic braking device 2.

The PKB 3 is connected to the brake calipers of the rear wheels 4RR and 4RL with the aid of brake wires 31L and 31R. The PKB 3 generates a braking force, a second braking force, when an actuator (not illustrated), including a motor and a gear mechanism, that operates in accordance with a control signal from the brake control ECU 1 actuates the brake calipers of the right and left rear wheels 4RR and 4RL with the aid of the brake wires 31R and 31L. The motor of the PKB 3 is actuated under duty control in accordance with the control signal for normal or reverse rotation. In this manner, the magnitude of the second braking force is controlled.

Under such circumstances, a braking force according to the duty ratio is generated. When a desired braking force is obtained, the motor of the PKB 3 is locked. When the locking of the motor is detected, the motor-actuating current is stopped, that is, the control signal is invalidated, thereby stopping (prohibiting) the control of the PKB 3. While the control of the PKB 3 is stopped, the gear mechanism does not operate. Therefore, the second braking force is maintained and the locked state is achieved.

The PKB 3 is actuated not only when the brake control ECU 1 sends a control signal during the parking support control operation but also when the parking brake switch (not illustrated) is turned on or off by the driver. In the latter case, the PKB 3 is actuated in response to a second actuating signal for the PKB 3 output by the brake control ECU 1 in accordance with the operation signal of the parking brake switch.

Referring to FIG. 2, the wheel speed sensors 5FL to 5RR are provided for the wheels 4FL to 4RR, respectively, for detecting the rotational speeds of the individual wheels 4FL to 4RR, and are configured such that their output signals are directly input to the brake control ECU 1. The wheel speed sensors 5FL to 5RR are, for example, semiconductor speed sensors using Hall elements. Therefore, a clear pulse of wheel rotation can be obtained even at a low speed. Accordingly, an accurate vehicle traveling speed can be detected even at a speed as low as for parking.

The engine control ECU 7 adjusts the amount of fuel consumption in the current traveling state with reference to an accelerator opening signal, which indicates the amount of accelerator operation, sent from an accelerator operation amount sensor 52, engine speed, fluid temperature, oxygen concentration in the exhaust, and the like, and gives command values to an engine 70, thereby controlling engine output. In this manner, the driving force for the right and left front wheels 4FR and 4FL that are actuated to rotate with the aid of an automatic transmission (AT) 71 and axles 72R and 72L is adjusted.

The AT 71 is a known device including a torque converter for transmitting the rotation of the engine 70 to the axles 72R and 72L, and is under gear shift control of a control device (not illustrated). The first embodiment concerns the performance of the parking support control operation by positively utilizing a state in which a vehicle travels at a low speed because of a creep phenomenon (hereinafter referred to as creep travel), but does not concern the control of the AT 71. Therefore, description of the control device for the AT 71 is omitted.

The parking support control ECU 8 is equivalent to a parking support control apparatus. When the parking support control ECU 8 receives a command signal instructing the execution of the parking support control operation for parking a vehicle into a garage or for parallel parking via a switch (not illustrated) for executing the parking support control operation, the parking support control ECU 8 calculates not only a final target parking position for garage parking or parallel parking but also a trajectory to the target parking position. In this case, the trajectory is calculated with reference to a distance x to an obstruction measured by an obstruction sensor 54, to be described below, included in the sensor unit 50 such that the vehicle VL of interest is not brought into contact with the obstruction. Then, the braking force is controlled with the output of a braking force control signal, sent from the parking support control ECU 8 to the brake control ECU 1, to make the vehicle VL travel along the calculated trajectory at a desired speed, thereby achieving the parking support control operation enabling the vehicle VL to be brought to the target parking position.

The parking support control ECU 8 executes a vehicle stop control operation, as one of various control operations in the parking support control operation, so that the vehicle VL can be accurately stopped at the target parking position. Now, processings performed by the parking support control ECU 8 will be described for separate cases of garage parking and parallel parking.

During the parking support control operation for garage parking, the parking support control ECU 8 first determines the vehicle-stop-control start position at which a vehicle stop control operation is to be started upon the arrival thereto of the vehicle VL traveling along the calculated trajectory. A method for determining the vehicle-stop-control start position will be described with reference to FIG. 3.

Figure 3:
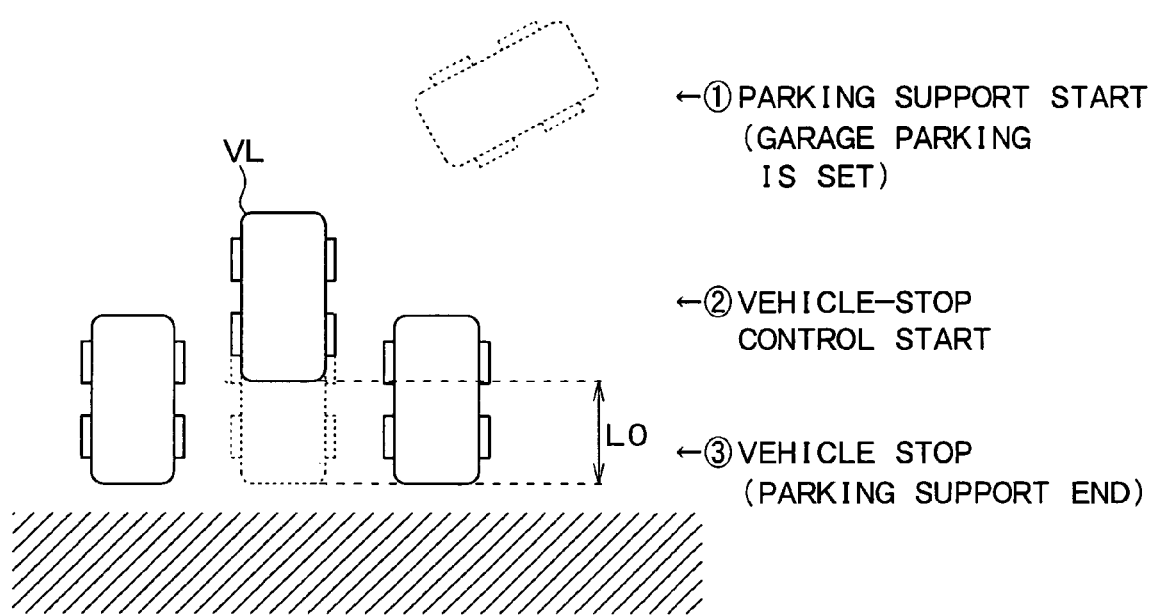
FIG. 3 is a schematic diagram showing the case of garage parking of a vehicle VL into a vacant space therebehind.

FIG. 3 is a schematic diagram showing the case of garage parking of the vehicle VL into a vacant space therebehind. First, a trajectory along which the vehicle VL is to be driven toward the vacant space is calculated. Then, with reference to the calculated trajectory, a distance with which the vehicle VL is expected to be brought to the target parking position by only being moved straight backward (40 to 50 cm, for example) is recorded as an initial value L0, for example. A position where a distance L from the vehicle VL to the target parking position becomes equal to the initial value L0 or a position immediately therebefore is determined as the vehicle-stop control start position.

When garage parking is actually started, the distance to the target parking position changes as the vehicle VL moves. Therefore, while garage parking is being performed, the parking support control ECU 8 calculates the current position indicating where the vehicle VL is currently located on the calculated trajectory. The current position is calculated from, for example, the traveling distances of the individual wheels 4RL to 4RR calculated in accordance with the detection signals of the wheel speed sensors 5FL to 5RR and a steering angle calculated in accordance with the detection signal of a steering angle sensor 51, to be described below, included in the sensor unit 50. Then, in accordance with the relationship between the current position and the trajectory calculated, the distance L from the current position to the target parking position is calculated.

At a position where the current position matches the vehicle-stop-control start position, the vehicle stop control operation is started. The parking support control ECU 8 compares the recorded initial value L0 with the distance L from the current position to the target parking position, thereby determining a target speed VREF of the vehicle VL located at the current position. In order to realize the target speed VREF, the parking support control ECU 8 outputs a driving force control signal and a braking force control signal to the engine control ECU 7 and the brake control ECU 1.

On the other hand, also during the parking support control operation for parallel parking, the parking support control ECU 8 determines the vehicle-stop-control start position at which the vehicle stop control operation is to be started upon the arrival thereto of the vehicle VL traveling along the calculated trajectory. A method for determining the vehicle-stop-control start position in this case will be described with reference to FIG. 4.

Figure 4:
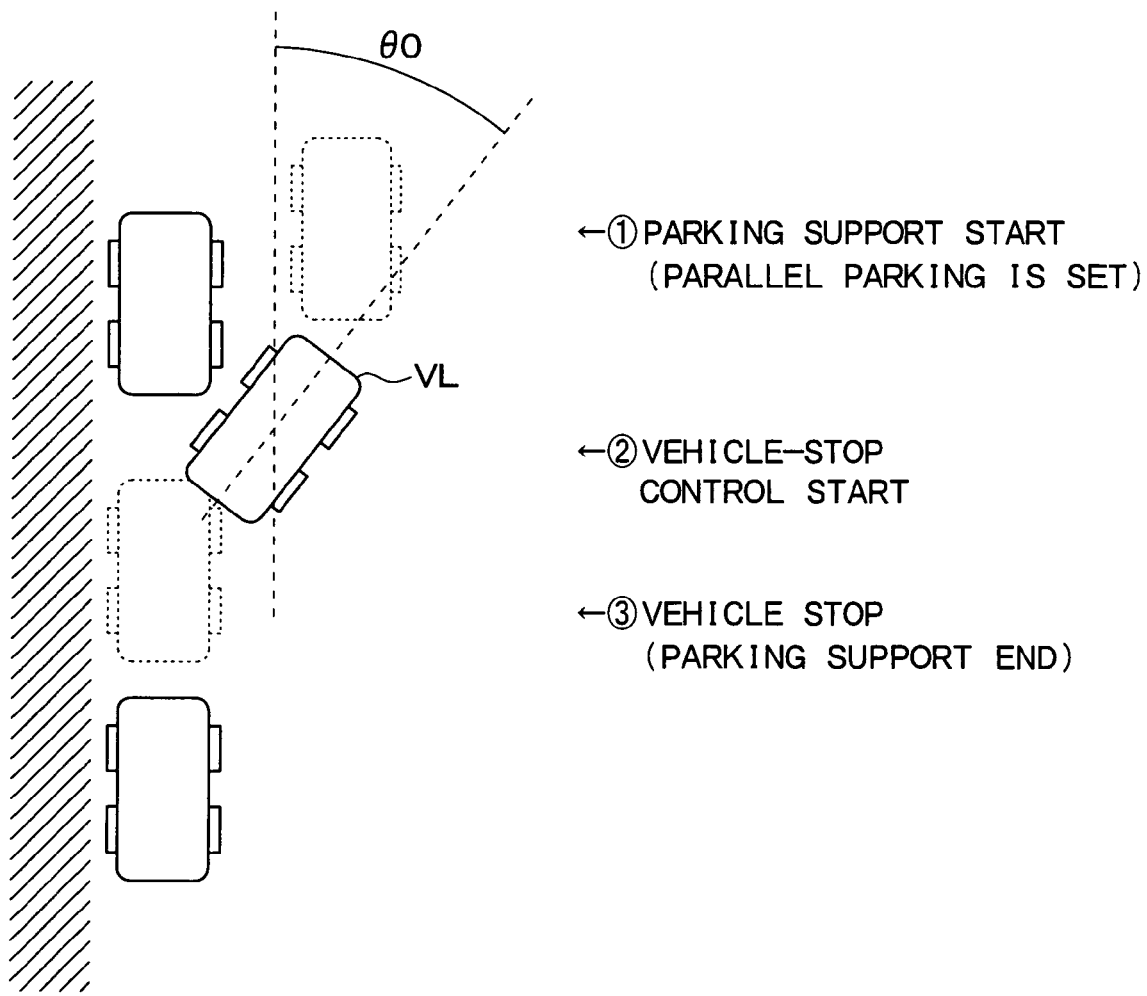
FIG. 4 is a schematic diagram showing the case of parallel parking of the vehicle VL into a vacant space therebehind on the left.

FIG. 4 is a schematic diagram showing the case of parallel parking of the vehicle VL into a vacant space therebehind on the left. As shown in FIG. 4, the angle of the vehicle VL with respect to that at the target parking position, i.e., the vehicle deviation angle θ, changes as the vehicle VL moves for parallel parking.

In this case, the vehicle VL is moved so as to be oriented toward the vacant space while increasing the vehicle deviation angle θ. After the vehicle VL is exactly oriented toward the vacant space, the vehicle VL is moved while gradually reducing the vehicle deviation angle θ. In this manner, the vehicle VL can be parked into the vacant space.

Therefore, the vehicle deviation angle θ to be set as the initial value θ0 (5°, for example) is the angle in the last movement in a series of movements during the parallel parking operation, i.e., the vehicle deviation angle θ at any point while the vehicle deviation angle θ is gradually decreasing, for example, a point where the vehicle deviation angle θ becomes the largest (or a point immediately therebefore) or any point while the vehicle deviation angle θ that has become the largest is decreasing. Thus, the position represented by the initial value θ0 or a position immediately therebefore (for example, a position at a predetermined angle before the initial value θ0) is set as the vehicle-stop-control start position.

Further, when performing parallel parking, the parking support control ECU 8 calculates the current position indicating where the vehicle VL is currently located on the calculated trajectory. The current position is calculated from, for example, the traveling distances of the individual wheels 4RL to 4RR calculated in accordance with the detection signals of the wheel speed sensors 5FL to 5RR and a steering angle calculated by the steering angle sensor 51 included in the sensor unit 50. Then, in accordance with the relationship between the current position and the trajectory calculated, the vehicle deviation angle θ at the current position is calculated.

At a position where the current position matches the vehicle-stop-control start position, the vehicle stop control operation is started. The parking support control ECU 8 compares the recorded initial value θ0 with the vehicle deviation angle θ at the current position, thereby determining the target speed VREF for stopping the vehicle VL. In order to realize the target speed VREF, the parking support control ECU 8 outputs a driving force control signal and a braking force control signal to the engine control ECU 7 and the brake control ECU 1.

The warning indication and alarm generation device 9 includes a warning indicator, such as a lamp or a display, and an alarm generator, such as a buzzer or a speaker, and notifies the driver of, for example, execution of various control operations by turning on a lamp, displaying a message, generating an alarm sound through a buzzer or a speaker.

The sensor unit 50 includes the steering angle sensor 51, the accelerator operation amount sensor 52, the braking operation amount sensor 53, and the obstruction sensor 54.

The steering angle sensor 51 detects the angle of a steering operation, i.e., the steering angle. The accelerator operation amount sensor 52 detects the amount of accelerator pedal operation. The braking operation amount sensor 53 detects the amount of brake pedal operation.

The obstruction sensor 54 detects obstructions around the vehicle VL. The obstruction sensor 54 measures a distance x to obstructions located ahead and behind the vehicle by using corner sonar units provided on the bumpers, for example, on the front and rear of the vehicle, and sends the measured value and the differential signal of the measured value to the brake control ECU 1, the parking support control ECU 8, and the like, via the in-vehicle LAN bus 6. The differential signal of the distance x corresponds to the relative speed with respect to obstructions such as other vehicles traveling ahead and behind the vehicle of interest.

The parking support control system according to the first embodiment is configured as described above. In the parking support control system having such a configuration, when a switch for starting the parking support control operation, not illustrated in the drawings, is turned on to make a request for executing garage parking or parallel parking, a parking support control start flag, not illustrated in the drawings, included in the parking support control ECU 8 is set while a flag indicating the performance of either garage parking or parallel parking is also set, whereby the parking support control operation for garage parking or parallel parking is initiated. On the other hand, the warning indication and alarm generation device 9 notifies the driver that the parking support control operation is valid.

Specifically, the parking support control ECU 8 calculates a target parking position for garage parking or parallel parking and a trajectory thereto in accordance with the detection signals and the like from the wheel speed sensors 5FL to 5RR, the hydraulic sensors 19*a*, 19*b*, 29*a*, and 29*b*, and the sensor unit 50. Then, the parking support control ECU 8 outputs the driving force control signal and the braking force control signal to the engine control ECU 7 and the brake control ECU 1 such that the vehicle VL travels along the calculated trajectory at a desired speed. Thus, the driving force and the braking force are controlled and the parking support control operation to bring the vehicle VL to the target parking position is achieved.

Figure 5:
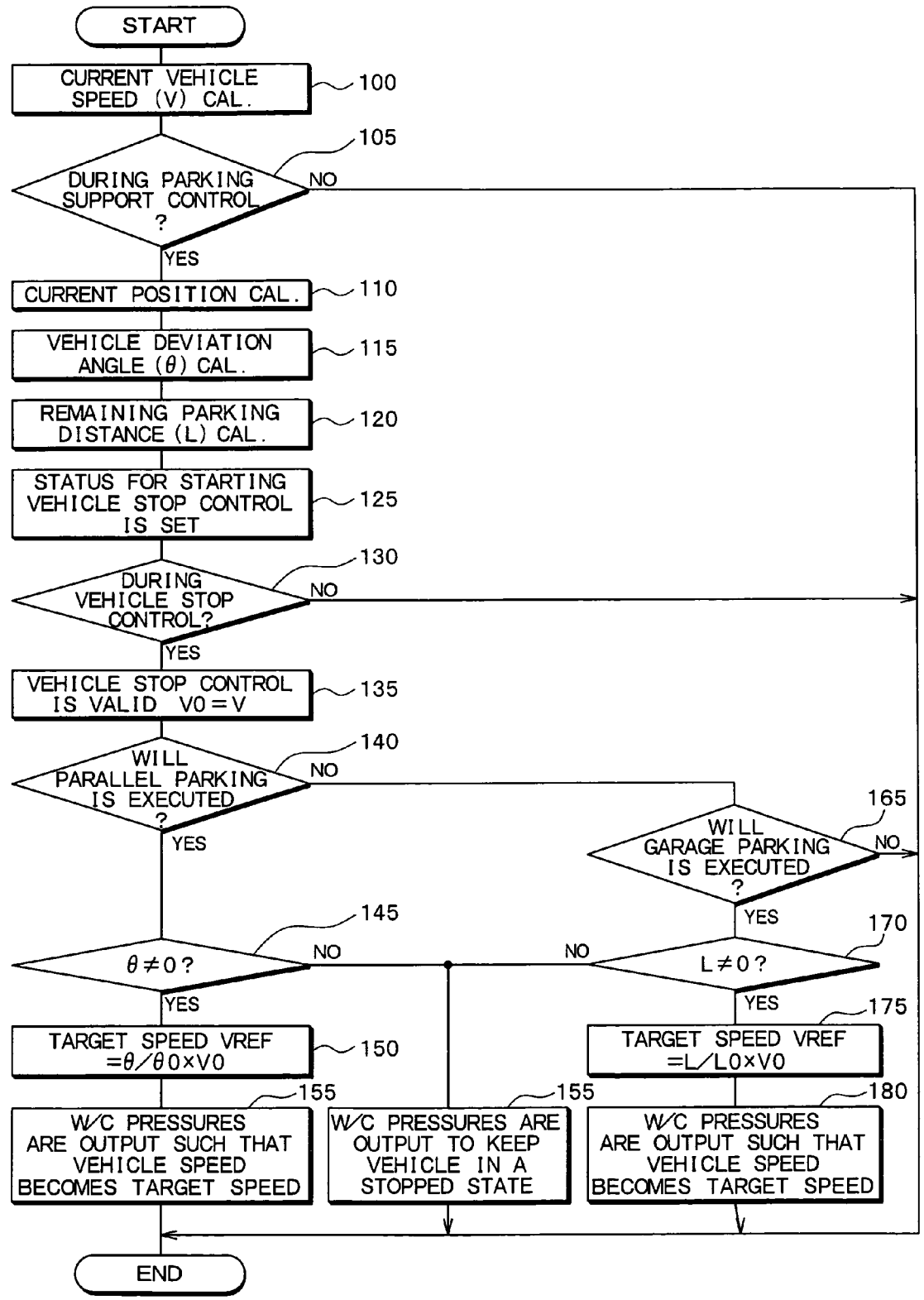
FIG. 5 is a flowchart of a vehicle stop control operation.

During the parking support control operation, the vehicle stop control operation characterizing the present invention is executed. Specifically, the parking support control ECU 8 performs various processings as described in the flowchart of the vehicle stop control operation shown in FIG. 5. Now, the vehicle stop control operation will be described in detail with reference to FIG. 5.

In Step 100, the current vehicle speed V is calculated. The vehicle speed V is calculated from the wheel speeds of the individual wheels 4FL to 4RR calculated in accordance with the detection signals of the wheel speed sensors 5FL to 5RR, by a known calculation method (such as a method in which the higher value of driven wheel speeds is taken as the vehicle speed).

Next, in Step 105, whether the parking support control operation is valid or not is checked. This check is based on whether the parking support control start flag, described above, is set or not. A negative result in this step indicates that the parking support control operation is invalid. Therefore, it is considered that there is no need to execute the vehicle stop control operation, and the process is completed.

In contrast, if a positive result is obtained in Step 105, the process proceeds to Step 110 to calculate the current position indicating where the vehicle VL is currently located on the calculated trajectory, as described above. Then, the process proceeds to Step 115 to obtain the vehicle deviation angle θ. The vehicle deviation angle θ is calculated by calculating the direction in which the vehicle VL is currently oriented in accordance with the relationship between the current position and the trajectory calculated and comparing the current orientation with the orientation of the vehicle VL at the target parking position.

Next, the process proceeds to Step 120 to calculate the remaining parking distance L, i.e., a distance L from the current position to the target parking position. The distance L can also be calculated in accordance with the relationship between the current position and the trajectory calculated in the earlier step, as described above.

The process further proceeds to Step 125 to determine a status for starting the vehicle stop control operation. The initial value L0 for the distance L and the initial value θ0 for the vehicle deviation angle θ are calculated and recorded as described above. Then, for example, a position immediately before a position where the distance L becomes equal to the initial value L0 (L=L0+α, for example) in the case of garage parking or a position immediately before a position where the vehicle deviation angle θ becomes equal to the initial value θ0 (θ=θ0+β, for example) in the case of parallel parking is set as the vehicle-stop-control start position. The arrival of the vehicle at this position is defined as the status for starting the vehicle stop control operation.

Next, the process proceeds to Step 130 to check whether the vehicle stop control operation is valid or not, that is, whether the status for starting the vehicle stop control operation is satisfied or not. Specifically, as defined in Step 125 described above, whether or not the vehicle VL has reached a position immediately before a position where the distance L becomes equal to the initial value L0 (L=L0+α, for example) in the case of garage parking or whether or not the vehicle VL has reached a position immediately before a position where the vehicle deviation angle θ becomes equal to the initial value θ0 (θ=θ0+β, for example) in the case of parallel parking is checked. If the status for starting the vehicle stop control operation is satisfied, the vehicle stop control operation is considered valid, and the process proceeds to Step 135. If not, it is considered that execution of the vehicle stop control operation is not yet necessary, and the process is completed.

In Step 135, a vehicle speed V in the case where the vehicle stop control operation is valid is defined and recorded as the initial value V0. Then, the process proceeds to Step 140 to check whether the parking support control operation is for parallel parking or not. This check is based on the setting of the flag, indicating the performance of either garage parking or parallel parking, set when the switch for starting the parking support control operation is turned on.

If a positive result is obtained in this step, the process proceeds to Step 145 to check whether the vehicle deviation angle θ is 0 or not. If the vehicle deviation angle θ is not 0, the process proceeds to Step 150 to calculate the target speed VREF in order to execute the vehicle stop control operation. In this step, the target speed VREF is calculated in the following expression:

$$\text{Target speed } VREF = \theta/\theta 0 \times V0 \qquad \text{Expression 1}$$

That is, with the initial value V0 of the vehicle speed V as the reference speed, the ratio of the current vehicle deviation angle θ to the initial value θ0 is calculated as a coefficient R. Then, the coefficient R is multiplied by the initial value V0, whereby the target speed VREF is obtained. In this step, the current vehicle deviation angle θ gradually decreases from the initial value θ0. Therefore, the calculated coefficient R becomes lower than 1. Accordingly, the target speed VREF gradually decreases as the vehicle VL moves closer to the target parking position.

Then, in Step 155, the parking support control ECU 8 outputs a braking force control signal to the brake control ECU 1 such that the vehicle speed V becomes equal to the target speed VREF. Therefore, the hydraulic braking device 2 acts to increase the W/C pressures of the individual wheels 4FL to 4RR, as described above, whereby W/C pressures according to the braking force control signal are generated for the wheels 4FL to 4RR. In this manner, a braking force to make the vehicle speed V become equal to the target speed VREF is generated.

In contrast, if a negative result is obtained in Step 145, the process proceeds to Step 160. A vehicle deviation angle θ of 0 means that the vehicle VL is in the stopped state. Therefore, in order to maintain the stopped state of the vehicle VL, the parking support control ECU 8 outputs a braking force control signal to the brake control ECU 1. In this manner, the W/C pressures for the individual wheels 4FL to 4RR are set to values enabling the vehicle VL to be kept in the stopped state.

If a negative result is obtained in Step 140 already described above, the process proceeds to Step 165 to check whether or not the parking support control operation is for garage parking. This check is also based on the setting of the flag, indicating the performance of either garage parking or parallel parking, set when the switch for starting the parking support control operation is turned on.

If a positive result is obtained in this step, the process proceeds to Step 170 to check whether the distance L is 0 or not. If the distance L is not 0, the process proceeds to Step 175 to calculate the target speed VREF in order to execute the vehicle stop control operation. In this step, the target speed VREF is calculated in the following expression:

$$\text{Target speed } VREF = L/L0 \times V0 \qquad \text{Expression 2}$$

That is, with the initial value V0 of the vehicle speed V as the reference speed, the ratio of the current distance L to the initial value L0 is calculated as a coefficient R. Then, the coefficient R is multiplied by the initial value V0, whereby the target speed VREF is obtained. In this step, the current distance L gradually decreases from the initial value L0. Therefore, the calculated coefficient R becomes lower than 1. Accordingly, the target speed VREF gradually decreases as the vehicle VL moves closer to the target parking position.

Then, in Step 180, the same processing as in Step 155 is performed. In this manner, a braking force to make the vehicle speed V become equal to the target speed VREF is generated. In contrast, if a negative result is obtained in Step 170, the process proceeds to Step 160 to set the W/C pressures for the individual wheels 4FL to 4RR to values enabling the vehicle VL to be kept in the stopped state, as in the above-described case.

Figure 6:
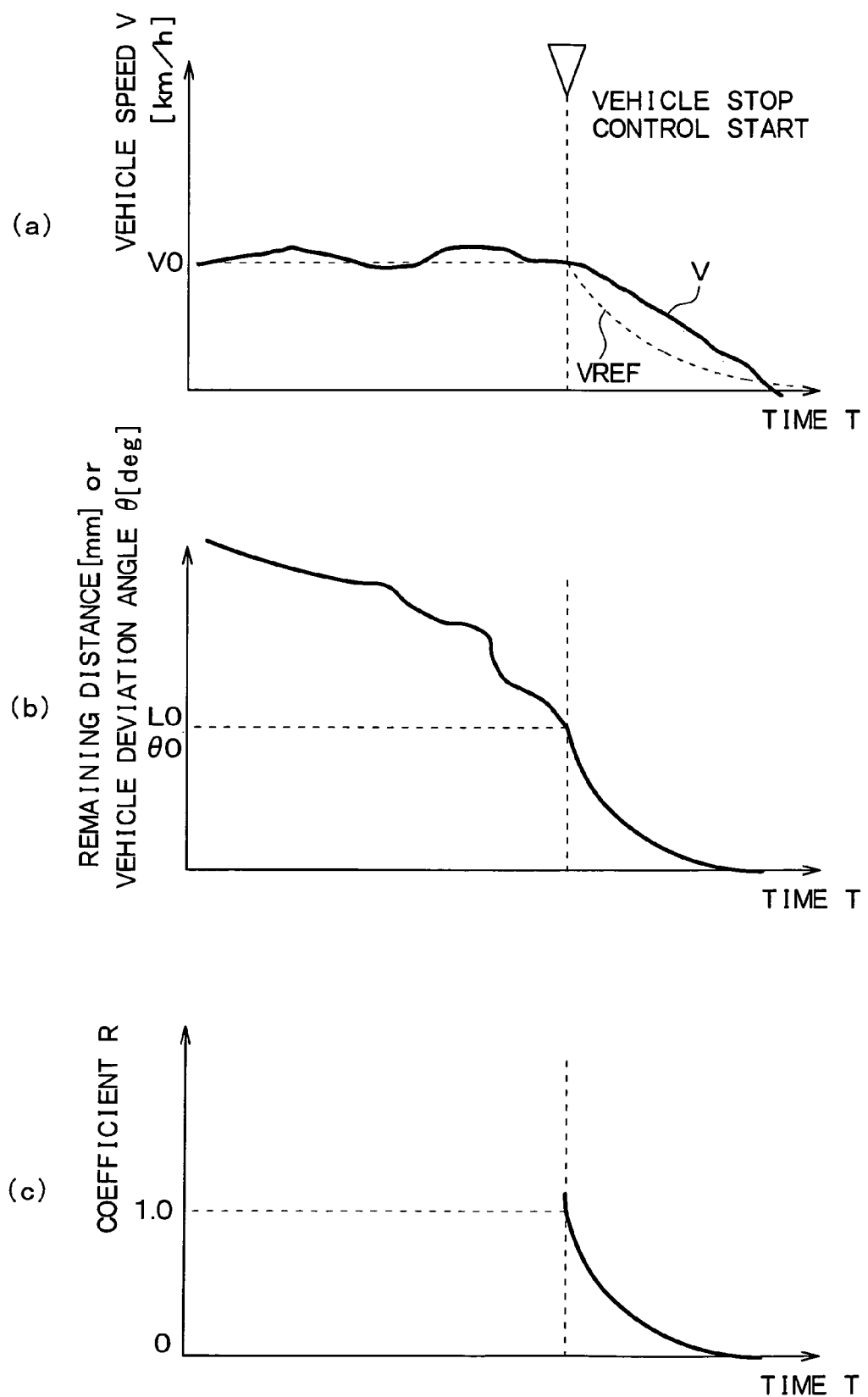
FIG. 6 includes timing charts in the case where the vehicle stop control operation is executed.

Thus, the vehicle stop control operation in the parking support control operation is executed. FIG. 6 shows timing charts in the case where such a vehicle stop control operation is executed, and includes part (a) showing the changes in the vehicle speed V and in the target speed VREF, part (b) showing the change in the vehicle deviation angle θ or in the distance L, and part (c) showing the change in the coefficient R.

As shown in the drawings, upon the start of the vehicle stop control operation, the current vehicle speed V is set as the initial value V0. Since the coefficient R calculated as the ratio of the distance L to the initial value L0 or the ratio of the vehicle deviation angle θ to the initial value θ0 becomes smaller as the vehicle VL moves closer to the target parking position, the target speed VREF gradually becomes smaller. Therefore, the vehicle speed V can be reduced gradually, whereby the vehicle speed V can be made very small at the target parking position. This enables accurate parking of the vehicle VL at the target parking position.

As described above, in the parking support control system of the first embodiment, the vehicle stop control operation is executed during the parking support control operation. With this vehicle stop control operation, the target speed VREF for the vehicle speed V becomes smaller as the vehicle VL moves closer to the target parking position. That is, the vehicle deviation angle θ or the distance L at the target parking position (i.e., the vehicle deviation angle θ=0, or the distance L=0) is taken as the reference displacement magnitude (zero position). In the case of parallel parking, the vehicle deviation angle θ is defined as the displacement magnitude of the vehicle VL. In the case of garage parking, the distance L to the target parking position is defined as the displacement magnitude of the vehicle VL. Further, the target speed VREF is designed to become smaller as these displacement magnitudes become closer to the reference displacement magnitude.

Specifically, after determining the initial value θ0 for the vehicle deviation angle θ or the initial value L0 for the distance L, a normalized coefficient R is calculated from the ratio of the vehicle deviation angle θ or the distance L to the initial value θ0 or L0. Then, using the coefficient R, the target speed VREF for the vehicle speed V is calculated.

Since the vehicle speed V of the vehicle VL is very small when the vehicle VL arrives at the target parking position, the vehicle VL can be accurately stopped at the target parking position. Further, since the target speed VREF is calculated by using a normalized coefficient R as described above, even if the inertia of the vehicle has changed because of a change in the number of passengers, there is no influence on these values, such as a change in the distance required to stop the vehicle. Further, even if the position for starting the vehicle stop control operation has changed, the vehicle VL can be stopped at the same target parking position with high accuracy.

Other Embodiments

In the first embodiment, a braking force is generated by using the hydraulic braking device 2 such that the vehicle speed V of the vehicle VL becomes the target speed VREF. However, the braking force may also be generated by cooperation of the hydraulic braking device 2 and the PKB 3, or only by the PKB 3.

In the first embodiment, the vehicle stop control operation is executed by controlling the braking force. However, the vehicle stop control operation can also be executed by controlling the driving force in accordance with the control signal sent from the parking support control ECU 8 to the engine control ECU 7, or by controlling both the braking force and the driving force.

Further, the current position of the vehicle VL may also be calculated from the change in the orientation and the traveling distance of the vehicle VL, which are obtained by the calculation of the curvature for turning the vehicle VL based on the steering angle of the vehicle VL, and the calculation of the change in the orientation of the vehicle VL based on the curvature and the traveling distance of the vehicle VL.

The steps shown in the drawings correspond to means for executing the respective processings.

The invention claimed is:

1. A parking support control apparatus for executing a parking support control operation in which a target parking position at which a vehicle is to be stopped and a trajectory along which the vehicle is to be moved toward the target parking position are calculated so as to move the vehicle along the trajectory, and for executing a vehicle stop control operation when arrival of the vehicle at a vehicle stop control start position is detected during the parking support control operation, the parking support control apparatus comprising a processor configured to:
   detect a current position of the vehicle traveling along the trajectory;
   calculate a displacement magnitude of the vehicle to be moved from the current position to the target parking position;
   determine a target speed, on the basis of a reference displacement magnitude that is set as the displacement magnitude of the vehicle that is considered to bring the vehicle to the target parking position, such that a speed of the vehicle becomes lower as the displacement magnitude of the vehicle at the current position becomes closer to the reference displacement magnitude;
   output a brake request so that the vehicle travels at the target speed and so that the vehicle stops when the displacement magnitude becomes equal to the reference displacement magnitude;
   obtain a vehicle speed of the vehicle;
   determine an initial displacement magnitude equivalent to an initial value of the displacement magnitude and determine a vehicle-stop-control start position at which the vehicle stop control operation is to be started upon the arrival thereto of the vehicle traveling along the calculated trajectory in accordance with the initial displacement magnitude; and
   output a vehicle speed set request so that the vehicle speed is set to the vehicle speed obtained when the displacement magnitude becomes equal to the initial displacement magnitude as an initial vehicle speed,
   wherein, when the detected current position matches the determined vehicle-stop-control start position, the processor is further configured to determine the target speed as a value obtained by multiplying a ratio of the displacement magnitude to the initial displacement magnitude by the initial vehicle speed.

2. The parking support control apparatus according to claim 1, wherein the processor is further configured to:
   determine the vehicle-stop-control start position as a position where the displacement magnitude on the travel path becomes equal to the initial displacement magnitude or a position immediately therebefore.

3. The parking support control apparatus according to claim 2, wherein the processor is further configured to:
   calculate a distance from the current position to the target parking position as the displacement magnitude.

4. The parking support control apparatus according to claim 2, wherein the processor is further configured to:
   calculate a vehicle deviation angle as the displacement magnitude, and
   define a deviation angle between an orientation of the vehicle at the current position and an orientation of the vehicle at the target parking position.

5. The parking support control apparatus according to claim 4, wherein the processor is further configured to:
   determine the current position from a traveling distance of the vehicle traveling along the trajectory, and
   calculate the traveling distance on the basis of traveling distances of at least two rear wheels determined from detection signals of wheel speed sensors provided in correspondence with wheels included in the vehicle and a steering angle determined from a detection signal of a steering angle sensor included in the vehicle.

6. The parking support control apparatus according to claim 3, wherein the processor is further configured to:
   determine the current position from a traveling distance of the vehicle traveling along the trajectory, and
   calculate the traveling distance on the basis of traveling distances of at least two rear wheels determined from detection signals of wheel speed sensors provided in correspondence with wheels included in the vehicle and a steering angle determined from a detection signal of a steering angle sensor included in the vehicle.

7. The parking support control apparatus according to claim 6, wherein
   the parking support control apparatus is part of a parking support control system that includes a braking force applying apparatus for applying a braking force to wheels included in the vehicle, and
   the braking force applying apparatus applies a braking force in accordance with a brake request received from the parking support control apparatus so that the target speed is achieved.

8. The parking support control apparatus according to claim 5, wherein
   the parking support control apparatus is part of a parking support control system that includes a braking force applying apparatus for applying a braking force to wheels included in the vehicle, and
   the braking force applying apparatus applies a braking force in accordance with the brake request received from the parking support control apparatus so that the target speed is achieved.

9. The parking support control apparatus according to claim 2, wherein the processor is further configured to:
   determine the current position from a traveling distance of the vehicle traveling along the trajectory, and
   calculate the traveling distance on the basis of traveling distances of at least two rear wheels determined from detection signals of wheel speed sensors provided in correspondence with wheels included in the vehicle and a steering angle determined from a detection signal of a steering angle sensor included in the vehicle.

10. The parking support control apparatus according to claim 9, wherein the parking support control apparatus is part of a parking support control system that includes a braking force applying apparatus for applying a braking force to wheels included in the vehicle, and the braking force applying apparatus applies a braking force in accordance with the brake request received from the parking support control apparatus so that the target speed is achieved.

11. The parking support control apparatus according to claim 1, wherein the processor is further configured to:

calculate a distance from the current position to the target parking position as the displacement magnitude.

12. The parking support control apparatus according to claim 11, wherein the processor is further configured to:

determine the current position from a traveling distance of the vehicle traveling along the trajectory, and calculate the traveling distance on the basis of traveling distances of at least two rear wheels determined from detection signals of wheel speed sensors provided in correspondence with wheels included in the vehicle and a steering angle determined from a detection signal of a steering angle sensor included in the vehicle.

13. The parking support control apparatus according to claim 12, wherein the parking support control apparatus is part of a parking support control system that includes a braking force applying apparatus for applying a braking force to wheels included in the vehicle, and the braking force applying apparatus applies a braking force in accordance with the brake request received from the parking support control apparatus so that the target speed is achieved.

14. The parking support control apparatus according to claim 1, wherein the processor is further configured to:

determine the current position from a traveling distance of the vehicle traveling along the trajectory, and calculate the traveling distance on the basis of traveling distances of at least two rear wheels determined from detection signals of wheel speed sensors provided in correspondence with wheels included in the vehicle and a steering angle determined from a detection signal of a steering angle sensor included in the vehicle.

15. The parking support control apparatus according to claim 14, wherein the processor is further configured to:

determine the current position from a traveling distance of the vehicle traveling along the trajectory, and calculate the traveling distance on the basis of traveling distances of at least two rear wheels determined from detection signals of wheel speed sensors provided in correspondence with wheels included in the vehicle and a steering angle determined from a detection signal of a steering angle sensor included in the vehicle.

16. The parking support control apparatus according to claim 15, wherein the parking support control apparatus is part of a parking support control system that includes a braking force applying apparatus for applying a braking force to wheels included in the vehicle, and the braking force applying apparatus applies a braking force in accordance with the brake request received from the parking support control apparatus so that the target speed is achieved.

17. The parking support control apparatus according to claim 1, wherein the processor is further configured to:

determine the current position from a traveling distance of the vehicle traveling along the trajectory, and calculate the traveling distance on the basis of traveling distances of at least two rear wheels determined from detection signals of wheel speed sensors provided in correspondence with wheels included in the vehicle and a steering angle determined from a detection signal of a steering angle sensor included in the vehicle.

18. The parking support control apparatus according to claim 17, wherein the parking support control apparatus is part of a parking support control system that includes a braking force applying apparatus for applying a braking force to wheels included in the vehicle, and the braking force applying apparatus applies a braking force in accordance with the brake request received from the parking support control apparatus so that the target speed is achieved.

19. The parking support control apparatus according to claim 1, wherein the parking support control apparatus is part of a parking support control system that includes a braking force applying apparatus for applying a braking force to wheels included in the vehicle, and the braking force applying apparatus applies a braking force in accordance with the brake request received from the parking support control apparatus so that the target speed is achieved.

* * * * *